Nov. 21, 1967 — A. M. BLECHMAN — 3,353,271
MAGNETIC ORTHODONTIC APPLIANCE
Filed April 1, 1965
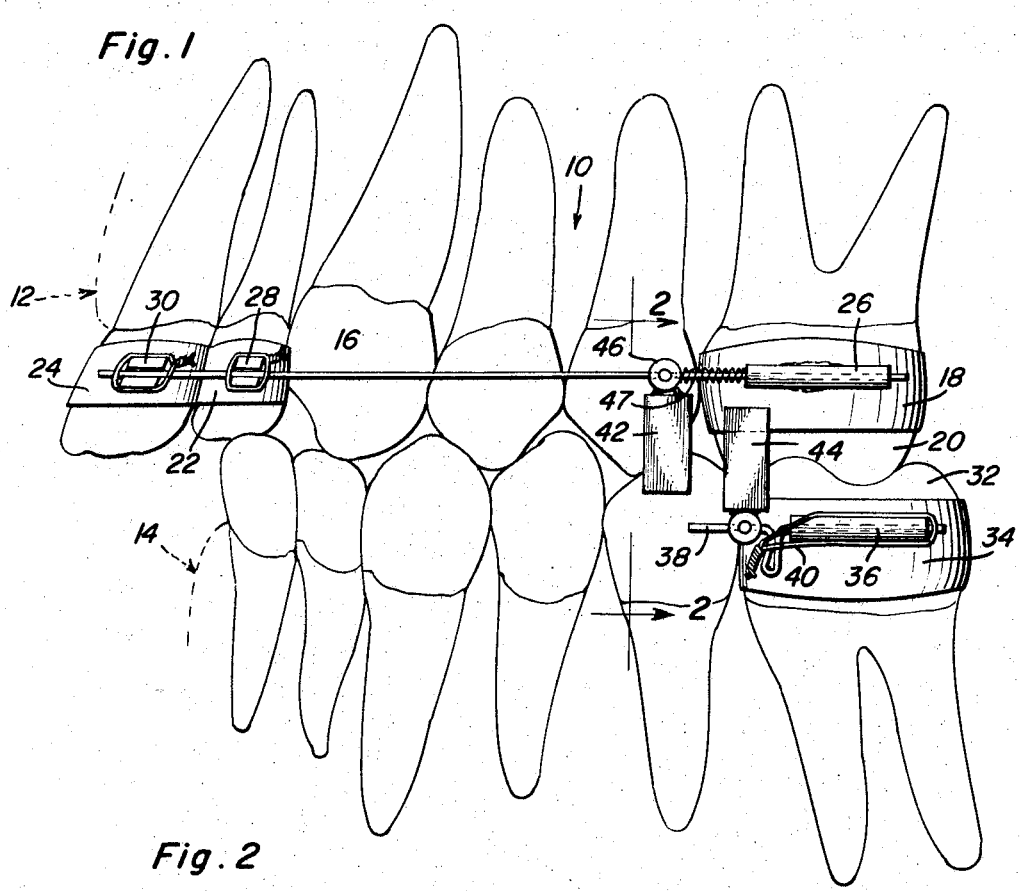
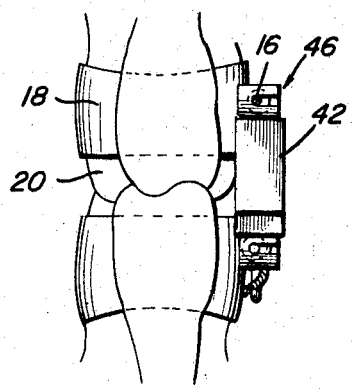
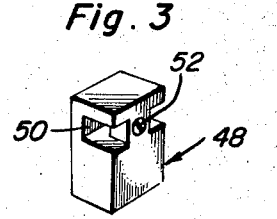
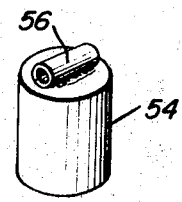
Abraham M. Blechman
INVENTOR.

United States Patent Office 3,353,271
Patented Nov. 21, 1967

3,353,271
MAGNETIC ORTHODONTIC APPLIANCE
Abraham M. Blechman, 771 Broadway,
Paterson, N.J. 07514
Filed Apr. 1, 1965, Ser. No. 444,571
7 Claims. (Cl. 32—14)

ABSTRACT OF THE DISCLOSURE

An orthodontic appliance through which corrective traction is applied to teeth by magnetically generated force derived from permanent magnets mounted intraorally by arch wires and anchoring bands on the buccal sides of the teeth. The spacing between the magnets is adjusted to regulate the traction force produced.

---

This invention relates to orthodontic appliances and more particularly to a new and useful method for producing a corrective force to be exerted on certain teeth of a patient in order to correct the relative positions of the teeth.

The present invention relates to a complete departure from orthodontic procedures heretofore utilized in that it involves the use of magnetic traction to produce corrective displacement of the patient's teeth. Thus, the apparatus of the present invention eliminates the use of intraoral elastics or rubber bands or extra oral elastic devices, presently relied upon to produce the requisite corrective forces. It is therefore a primary object of the present invention to provide an orthodontic appliance which does not rely upon the use of intraoral elastics or extra oral elastic devices which require cooperation of the patient in connection with the application and removal of such devices or elastics.

An additional object of the present invention is to provide an orthodontic appliance in which corrective force is produced magnetically by means of magnetic elements secured in close spaced relation to each other adjacent to occluding teeth. The magnetic elements are anchored in adjustably spaced relation to each other so that a force developed therebetween will tend to correctively displace the teeth in the upper jaw, for example, of a patient to which one of the magnetic elements is secured by means of an arch wire.

A still further object of the present invention is to provide an orthodontic appliance in which corrective forces are produced by magnetic traction utilizing pairs of magnetic elements adjustably mounted in closely spaced relation to each other for developing the requisite corrective force.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of an orthodontic appliance in accordance with the present invention shown intraorally installed in one typical environment;

FIGURE 2 is a sectional view taken substantially through a plane indicated by the section line 2—2 in FIGURE 1;

FIGURE 3 is a perspective view of a modified form of mganetic element utilized in the orthodontic appliance of the present invention; and FIGURE 4 is a perspective view of a further modified form of magnetic element.

Referring now to the drawings in detail, FIGURE 1 depicts one installation for the orthodontic appliance of the present invention generally denoted by reference numeral 10. The appliance is shown in connection with one of the most common orthodontic situations for which it is particularly applicable, namely protrusion of the teeth of the upper jaw 12 relative to the lower jaw 14. It should be appreciated, however, that other applications for the magnetic orthodontic appliance are possible because of the installational flexibility associated with the apparatus of the present invention.

The appliance 10 as shown in FIGURES 1 and 2, includes an arch wire 16 mounted on the teeth of the upper jaw 12 in the usual manner. Accordingly, anchoring bands 18 are secured to the upper molars 20 of the posterior teeth while bands 22, and 24 are secured to the anterior teeth in order to support the arch wire and apply distal traction. The arch wire therefore extends through and is secured to the orthodontic tube 26 secured to the molar band 18 and is received within notches in the brackets 28 and 30 secured to the bands 22 and 24, respectively. Wires hold the arch wire in the brackets 28 and 30 and in the orthodontic tube 26. Also secured to the lower molar 32 in occlusion with the upper molar 20, is an anchoring band 34 to which there is also secured an orthodontic tube 36. A mounting wire member 38 is secured to the tube 36 by the wire 40 and extends generally parallel to the plane of the arch wire 16.

Mounted on the arch wire 16 and the mounting wire member 38 on both buccal sides of the teeth in a patient's mouth are a pair of magnetic elements 42 and 44. These magnetic elements may vary in size and strength, but preferably follow the general dimensions of six millimeters by four millimeters by three millimeters. The shape and orientation of the magnetic forces may also be varied to suit the installation. Various types of magnetic materials may be utilized such as "Alnico," a platinum cobalt alloy or other magnetic materials which fit the requirements of the orthodontic situation. When utilizing certain magnetic materials, it may also be necessary to treat the material by coating thereof, with silver plating of "Teflon" for example because of the oral environment. A suitable lock device 46 is rigidly mounted at one end of each of the magnetic elements so that magnet 42 may be adjustably secured to the arch wire 16 spaced by coil spring 47 from the tube 26. The magnet 44 on the other hand is secured to the mounting member 38 in close spaced relation to the magnet 42, both bridging the occluding upper and lower teeth as shown. Any suitable lock device 46 may be utilized such as a "Russell" lock shown in FIGURES 1 and 2 to hold the magnetic elements in adjusted positions. This type of lock device permits the magnetic elements to be secured in position and easily shifted in order to vary the spacing between the magnetic elements and thereby vary the magnetic force produced by the interacting magnetic fields of the magnetic elements. FIGURE 3 illustrates a modified form of magnetic element 48 having a groove 50 through which the arch wire or mounting wire may extend with a set-screw 52 for securing the magnetic element to the arch wire. FIGURE 4 illustrates a still further modified form of magnetic element 54 which is cylindrical in shape and has a buccal tube 56 attached thereto so that the magnetic element may be slidably mounted on the arch wire and secured in position by a wire. In this regard it will also be apparent that the magnets may be positioned so as to develop either attractive or repulsive forces.

From the foregoing description, it will be apparent that the magnetic elements 42 and 44 as described in connection with FIGURES 1 and 2, will produce through magnetic attraction a horizontal posterior force on the teeth of the upper jaw tending to correctively displace the upper teeth relative to the lower teeth. The magnetic traction therefore offers the only means of obtaining such a posterior force without patient cooperation since the corrective force is generated entirely intraorally. It should be appreciated, however, that the size, shape and spacing between the magnetic elements may be altered depending upon the strength of the magnetic attraction required and the amount of space to maneuver in. The installational flexibility of the magnetic orthodontic appliance will therefore be appreciated. Although the orthodontic appliance of the present invention is especially useful in that it eliminates the need for extra oral elastic devices, it is possible to utilize extra orally mounted large permanent magnet devices for cooperation with the magnetic elements mounted intraorally, wherein magnetic attraction is exerted through the cheeks of the patient's mouth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an orthodontic appliance having an arch wire adapted to be secured to the teeth of a person, means for generating a corrective force including a first magnetic element secured to said arch wire, a second magnetic element and anchoring means for mounting said second magnetic element on the buccal side of the teeth within the magnetic field of the first magnetic element.

2. In an orthodontic appliance having an arch wire and anchoring bands adapted to be mounted on the teeth of one of the upper and lower jaws of a patient, means for intraorally exerting a corrective force on the teeth of said upper jaw relative to the teeth on the lower jaw comprising magnetic means anchored to a tooth on the other of said upper and lower jaws, and a magnetic element secured to the arch wire within the magnetic field of the magnetic means.

3. In an orthodontic appliance having an arch wire, means for generating a corrective force intraorally comprising at least two permanent magnets mounted in close spaced relation to each other, a pair of anchoring bands adapted to be secured to occluding posterior teeth of a patient, means securing the arch wire to one of said anchoring bands, mounting means secured to the other of said anchoring bands, and lock means adjustably securing said magnet to the arch wire and the mounting means for regulating the corrective force generated by the magnetic fields of the magnets.

4. In an orthodontic appliance, at least two magnetic elements, and means adapted to intraorally mount said magnetic elements on the buccal side of the teeth in close spaced relation to each other for producing a corrective magnetic force substantially in a horizontal direction.

5. In an orthodontic appliance having an arch wire, a magnetic element secured to said arch wire, and means for establishing a magnetic field in fixed relation to said magnetic element to magnetically exert a corrective force substantially in parallel spaced relation to the arch wire.

6. In combination with a magnetic field established intraorally, an orthodontic appliance including a plurality of anchoring bands adapted to be mounted on anterior and posterior teeth, an arch wire mounted by said bands through which traction is applied to the teeth, a magnetic element extending vertically from the arch wire adapted to bridge occluding teeth on the buccal sides thereof, and means for fixedly mounting the magnetic element in an adjusted position on the arch wire within the magnetic field to regulate the magnetic force exerted thereon.

7. The combination of claim 6 wherein said magnetic field is established by a magnet adapted to be fixedly mounted on the buccal side of a tooth, in occlusion with the posterior tooth, on which one of said anchoring bands is mounted.

References Cited

UNITED STATES PATENTS

| | | | |
|---|---|---|---|
| 3,092,907 | 6/1963 | Traiger | 32—12 |
| 3,158,934 | 12/1964 | Waldman | 32—14 |

FOREIGN PATENTS 477,948  10/1951  Canada.

RICHARD A. GAUDET, *Primary Examiner.*

J. W. HINEY, *Assistant Examiner.*